United States Patent
Doorn et al.

(10) Patent No.: US 11,184,317 B1
(45) Date of Patent: Nov. 23, 2021

(54) SIMPLIFIED USER INTERFACE FOR VIEWING THE CURRENT STATUS OF MESSAGE THREADS

(71) Applicant: Amazon Technologies, Inc., Seattle, WA (US)

(72) Inventors: Ivo van Doorn, The Hague (NL); Matthijs Frans Wessels, The Hague (NL); Enrico Huijbers, Rotterdam (NL); Steven Alexander Hardy, Delft (NL); Robert Vos, South Holland (NL); Markus Petrus Giuseppe Sartor, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 14/918,248

(22) Filed: Oct. 20, 2015

(51) Int. Cl.
*H04L 12/58* (2006.01)
*G06Q 10/10* (2012.01)

(52) U.S. Cl.
CPC ........... *H04L 51/34* (2013.01); *G06Q 10/107* (2013.01); *H04L 51/16* (2013.01); *H04L 51/24* (2013.01)

(58) Field of Classification Search
CPC ......... H04L 51/08; H04L 51/22; H04L 51/18; H04L 51/16; H04L 51/24; H04L 51/32; H04L 51/34
USPC ....................................................... 709/206
See application file for complete search history.

(56) References Cited

U.S. PATENT DOCUMENTS

| | | | | |
|---|---|---|---|---|
| 2007/0197196 A1* | 8/2007 | Shenfield | ................ | H04L 67/26 455/412.2 |
| 2009/0010397 A1* | 1/2009 | Stanze | ................. | H04Q 3/0075 379/9.03 |
| 2011/0066559 A1* | 3/2011 | White | .................... | G06Q 10/00 705/304 |
| 2012/0210334 A1* | 8/2012 | Sutedja | ................ | G06Q 10/107 719/314 |
| 2013/0027428 A1* | 1/2013 | Graham | .................. | H04L 51/32 345/633 |
| 2013/0090976 A1* | 4/2013 | White | .................... | G06Q 10/20 705/7.27 |
| 2014/0172987 A1* | 6/2014 | Luu | ........................ | H04L 51/16 709/206 |
| 2015/0271120 A1* | 9/2015 | Langholz | ............ | G06F 3/04817 709/206 |

(Continued)

*Primary Examiner* — Chris Parry
*Assistant Examiner* — Weiwei Y Stiltner
(74) *Attorney, Agent, or Firm* — Lee & Hayes, P.C.

(57) ABSTRACT

Functionality is disclosed for providing status updates for email threads. A personal information management (PIM) server application receive a first message and a second message. The PIM server application can extract a first status value from the first message and a second status value from the second message, and can generate a status notification message that includes one or both of the first status value or the second status value. The PIM server application can also receive a third message subsequent to the first and second messages, and extract a third status value from the third message. Subsequently, the status notification message can be updated by replacing the first status value or the second status value with the third status value in the status notification message. In this manner, the status notification message can provide a consolidated view of the latest status of multiple email threads.

21 Claims, 10 Drawing Sheets

(56) References Cited

U.S. PATENT DOCUMENTS

| | | | | |
|---|---|---|---|---|
| 2015/0350147 A1* | 12/2015 | Shepherd | ................ | H04L 51/24 |
| | | | | 715/752 |
| 2016/0065736 A1* | 3/2016 | Pedersen | ................ | H04M 3/51 |
| | | | | 379/266.07 |
| 2016/0099908 A1* | 4/2016 | Gelfenbeyn | ............ | H04L 51/36 |
| | | | | 709/206 |
| 2016/0283889 A1* | 9/2016 | Shukla | ........... | G06Q 10/063114 |

\* cited by examiner

| DETAILED STATUS OF TICKET 1234 | | | |
|---|---|---|---|
| STATUS | DATE | CLICK TO UNHIDE ASSOCIATED E-MAIL | CLICK TO DELETE ASSOCIATED E-MAIL |
| JOHN TO ATTEND JOB ON MAY 2, 2015 | MAY 1, 2015, 5 PM | CLICK | CLICK |
| JOB ASSIGNED TO JOHN | MAY 1, 2015, 11 AM | CLICK | CLICK |
| TICKET INITIATED | MAY 1, 2015, 10 AM | CLICK | CLICK |

FROM: TICKET TRACKING SYSTEM

TO: JANE DOE

| | TICKET NUMBER | STATUS | DATE |
|---|---|---|---|
| | 1234 | JOHN TO ATTEND JOB ON MAY 2, 2015 | MAY 1, 2015, 5 PM |
| | 1306 | TICKET RESOLVED AND CLOSED | MAY 1, 2015, 5 PM |
| | 1300 | JOB COMPLETED BY HARRY | MAY 1, 2015, 1 PM |
| | 1234 | JOB ASSIGNED TO JOHN | MAY 1, 2015, 11 AM |
| | 1234 | TICKET INITIATED | MAY 1, 2015, 10 AM |
| | 900 | TICKET RESOLVED AND CLOSED | APRIL 29, 2015, 1 PM |
| | 880 | HARRY TO CONTACT THE VENDOR TO FIND A SOLUTION | APRIL 28, 2015, 10 AM |

MAILBOX FOR JANE DOE

- INBOX
  - TICKET TRACKING
  - LATEST TICKET STATUS
- SENT MAILS
- JUNK MAILS

SIMPLIFIED USER INTERFACE FOR VIEWING THE CURRENT STATUS OF MESSAGE THREADS

Electronic mail ("email") has become a ubiquitous way of modern communication. As a result, some users can receive a large number of emails (e.g., tens, or even hundreds of emails) in a single day. Sorting through such a large number of emails to locate the most pertinent email messages can be time consuming and inefficient for email users.

In some environments, users receive a large number of emails that are part of the same email message thread. For example, in some environments a user can submit a trouble ticket (or be associated with the submission or resolution of a trouble ticket) to a trouble ticket system to report an issue. The trouble ticket system can generate automated email messages that track various stages through which the trouble ticket progresses. Thus, a large number of emails can be generated for a single trouble ticket.

A user assigned to oversee, or otherwise associated with, multiple trouble tickets can, for example, receive multiple emails for each of the trouble tickets. To view the latest status of multiple trouble tickets, the user might have to read multiple emails. It can, however, be difficult for the user to sort through the many emails for multiple trouble tickets in order to determine the current status of a particular trouble ticket.

In another example, a change management system can keep track of changes occurring in a project, service, a software, or a component. The change management system might also generate numerous automated emails that describe the current status of a specific project. A user handling multiple projects can also receive a large number of emails and, as a result, it can be difficult for the user to determine the latest status of multiple projects (e.g., the user might have to examine a large number of emails to determine the current status of the multiple projects).

The disclosure made herein is presented with respect to these and other considerations.

BRIEF DESCRIPTION OF THE DRAWINGS

FIG. 2C is a UI diagram that illustrates the detailed status of an example trouble ticket, according to one configuration disclosed herein;

FIG. 3C is a UI diagram illustrating a message display UI, which shows the detailed status of multiple trouble tickets, according to one configuration disclosed herein;

DETAILED DESCRIPTION

Figure 1:
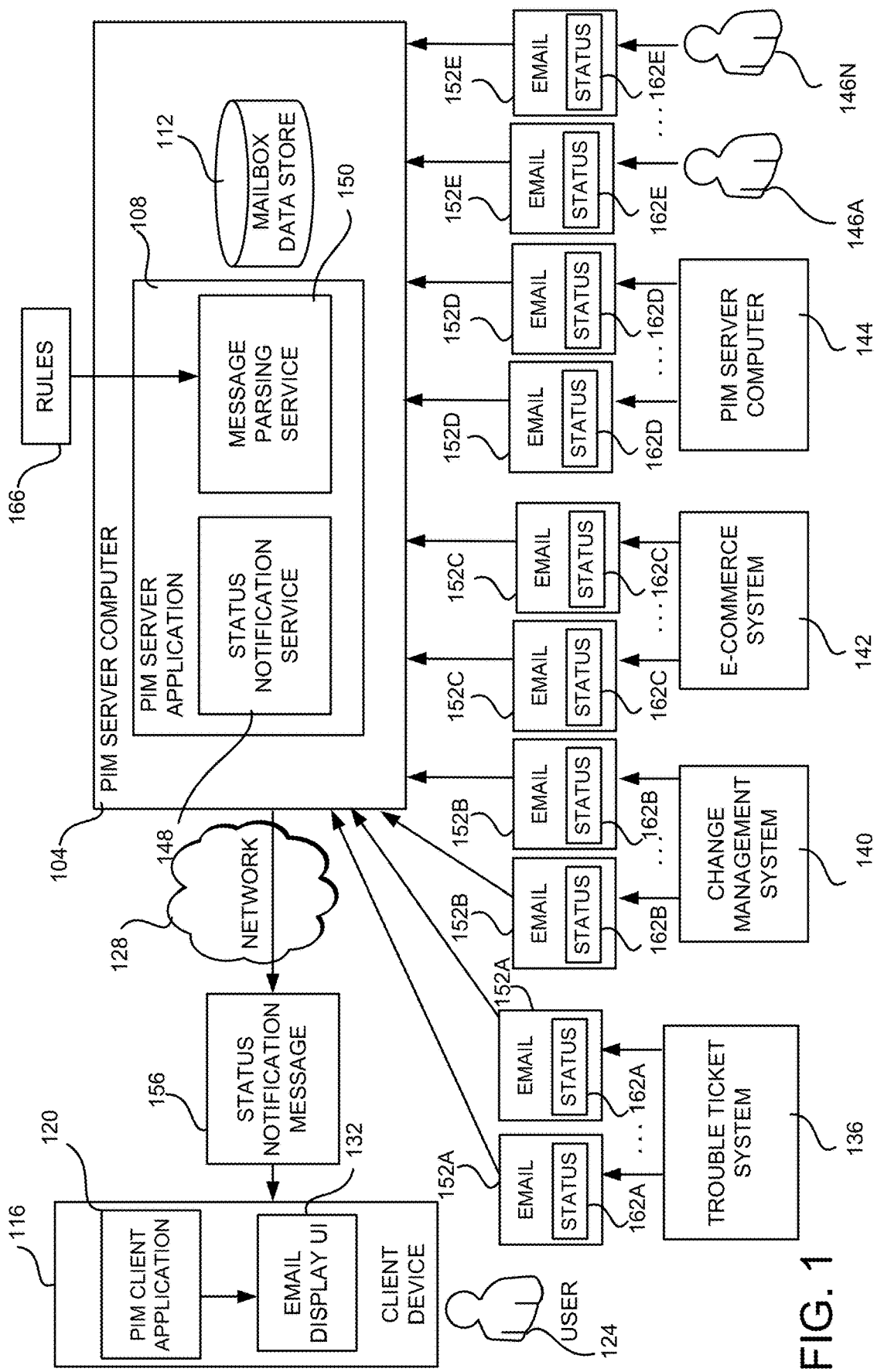
FIG. 1 is a computer system architecture diagram showing aspects of the configuration and operation of several components described herein for providing a user interface ("UI") for viewing the current status of message threads, according to one configuration.

The following detailed description is directed to technologies for analyzing, organizing, and providing a UI for viewing the current status of message threads. Utilizing the technologies described herein, a user of a personal information management ("PIM") client application, or another type of messaging application, can be provided with a consolidated view that shows the latest status of multiple message threads, without requiring the user to read individual messages in the threads to determine the latest status.

For example, and without limitation, in one particular configuration the technologies disclosed herein can be utilized with email messages. In particular, a PIM server application executes on a PIM server computer, and transmits emails to a PIM client application running on a client device. The PIM client application can be configured to display emails to a user of the client device.

The PIM server computer can receive multiple emails for the user of the client device from, for example, a trouble ticket system. The trouble ticket system can include functionality for allowing a user to create a trouble ticket, to track the current status of an issue, such as a technical problem, within an organization. A trouble ticket, for example, can be a running report on a particular issue, and can include a unique identification ("ID") number (e.g., a trouble ticket number), a status of the trouble ticket, and possibly other relevant data.

Once a trouble ticket has been created, the trouble ticket system can generate emails associated with the trouble ticket. For example, the emails can be generated for each stage the trouble ticket passes through. In an example, some or all of these emails are generated automatically by the trouble ticket system, while in another example, some or all of these emails are generated manually by personnel associated with the trouble ticket system. For example, emails can be generated when the trouble ticket is created, when an issue associated with the trouble ticket is assigned to an individual for resolution, when the individual generates an estimate as to how long it will take to address the issue, when the individual first confronts the issue, when the issue is resolved, and/or the like. Emails generated by the trouble ticket system might also be referred to herein as "trouble ticket emails." In this regard, it should be appreciated that a trouble ticket system can generate other types of messages in addition to or as an alternative to emails including, but not limited to, short messaging system ("SMS") messages, text messages, etc.

The PIM server computer can receive multiple emails for the user of the client device from, for example, the trouble ticket system, where the multiple emails are associated with one or more trouble tickets. For example, emails associated with a first trouble ticket (e.g. having the same ID number) are assumed to be a part of a first email thread, emails associated with a second trouble ticket (e.g. having the same ID number) are assumed to be a part of a second email thread, and so on. An email that is last received (i.e., most recently received) for an email thread is referred to herein as a "latest email" for the email thread. That is, if an email thread has multiple emails directed to the user of the client device, the most recently generated email is the latest email in the email thread. Of course, as and when new emails arrive, the latest email of the email thread dynamically changes.

In an example, individual emails received from the trouble ticket system include a corresponding ID number and a corresponding status of the associated trouble ticket. The ID number can be, for example, a unique trouble ticket number assigned to the trouble ticket. If, for example, two emails have the same ID number, then the two emails are assumed to belong to the same email thread and are assumed to be associated with the same trouble ticket.

In an example, the PIM server computer can receive multiple emails for the user of the client device from the trouble ticket system, where the multiple emails are associated with one or more trouble tickets. In another example, the PIM server computer can generate a status notification message that includes data describing the latest status of each of the one or more trouble tickets. For example, assume that a first email, a second email and a third email are received, in that order, by the PIM server application, where the first email, the second email and the third email are directed to the user of the client device and are associated with a first trouble ticket. Also assume that a fourth email, a fifth email and a sixth email are received, in that order, by the PIM server application, where the fourth email, the fifth email and the sixth email are also directed to the user of the client device and are associated with a second trouble ticket.

Emails associated with the first trouble ticket have the same ID number (i.e., the first trouble ticket number) and are assumed to be a part of a first email thread. Similarly, emails associated with the second trouble ticket have the same ID number (i.e., the second trouble ticket number) and are assumed to be a part of a second email thread. Also, the third email in this example is the latest email of the first email thread, and the sixth email is the latest email of the second email thread. Accordingly, a status notification message can be generated that includes data identifying the status as indicated in the third email (e.g., which represents the latest status of the first trouble ticket) and data indicating the status as indicated in the sixth email (e.g., which represents the latest status of the second trouble ticket).

The PIM server application can transmit the status notification message to the client device for display. The status notification message can then be displayed in a UI on the client device in order to provide a consolidated view of the latest status of the first and second trouble tickets.

The client device can display the status notification message to the user, without displaying the underlying emails (e.g., the first, . . . , sixth emails) in each email thread to the user. Thus, the user views only a single consolidated email with the latest status of the first and second trouble tickets, without having to interact with or even view the underlying six emails. In an example, the six emails can be saved by the PIM server application (and can also be saved in the PIM client application) in an appropriate data store, but marked as hidden, so that the messages will not be displayed by the PIM client application. In another example, the six emails are not transmitted by the PIM server application to the PIM client application, so that the messages will not be displayed by the PIM client application on the client device. The UI can include UI controls selectable by the user in order to view the underlying emails.

In an example, the status notification message can be updated when new emails associated with the first email thread and/or second email thread arrive. For example, assume that a seventh email is received at the PIM server application, where the seventh email is directed to the user of the client device and is associated with the first trouble ticket. The seventh email is now the latest email in the first email thread. Accordingly, the status notification message is updated to replace the status information obtained from the third email with the status information obtained from the seventh email (i.e., which represents the current latest status of the first trouble ticket).

In another example, the PIM server application can, instead of generating a single consolidated status notification message for both the first and second email threads, generate a first status notification message for the first email thread and a second status notification message for the second email thread. The first status notification message can include data indicating the status as specified in the third email (i.e., which represents the latest status of the first trouble ticket), and the second status notification message can include data indicating the status as set forth in the sixth email (i.e., which represents the latest status of the second trouble ticket). Thus, the first and second status notification messages provide data indicating the latest status of the first and second trouble tickets, respectively. The PIM server application can then transmit the first and second status notification messages to the client device for display. The client device can display the first and second status notification messages to the user.

It should be appreciated that the examples provided herein wherein the disclosed technologies are utilized in conjunction with a trouble ticket system are merely illustrative and that the technologies disclosed herein can be utilized with applications other than a trouble ticket system. For example, the technologies disclosed herein can be used to provide consolidated views of the latest status of email threads generated by a change management system, an e-commerce system, a flight reservation system, a package tracking system, or any other system configured to transmit multiple email messages on the same topic (i.e. in the same thread). In addition, the technologies disclosed herein can be used to consolidate emails generated by a user related to the same, or a similar, topic, for example in relation to editing a document, discussing a particular issue, or deciding on a particular strategy.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the technologies described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which can be referred to herein as a "FIG." or "FIGS.").

FIG. 1 is a computer system architecture diagram showing aspects of the configuration and operation of several components described herein for providing a UI for viewing the current status of message threads. In an example, the system architecture of FIG. 1 includes a PIM server computer 104 running a PIM server application 108. The PIM server computer 104 can represent one or more server computers. For example, the PIM server computer 104 can include one or more processors and memory that stores various modules, applications, programs, or other data. For example, the memory in the PIM server computer 104 can include instructions that, when executed by the processors in the PIM server computer 104, cause the processors to perform one or more operations described herein. In an example, the memory of the PIM server computer 104 can store the PIM server application 108. In an example, the memory and/or mass storage of the PIM server computer 104 can also store a mailbox data store 112. In an example, the PIM server application 108 can include a status notification service 148 and a message parsing service 150, both of which will be discussed in detail below.

In an example, the system architecture of FIG. 1 further includes a client device 116 running a PIM client application 120. The client device 116 can be an appropriate computing device on which a PIM client application 120 can execute, such as a smart phone, a tablet computer, a personal digital assistant ("PDA"), a laptop or desktop computer, or any other appropriate type of computing device. The PIM client application 120 can provide various PIM functionalities to a user 124 of the client device 120. For example, the PIM client application 120 can enable the user 124 to view or compose email messages, sort emails in various email folders, delete emails, and/or the like. In this regard, the PIM client application 120 can display emails to the user 124 via an email display UI 132 on the client device 116. In particular, the PIM client application 120 can display emails to the user that are stored in the mailbox data store 112. The PIM client application 120 can also provide functionality for maintaining an electronic calendar, a task list, and/or provide other types of functionality for managing personal information.

In an example, the client device 116 and the PIM server computer 104 are interconnected via a network 128. The network 128 can be a wireless or a wired network, or a combination thereof. The network 128 can be a collection of individual networks interconnected with each other and functioning as a single large network (e.g., the Internet or an intranet). Examples of such individual networks include, but are not limited to, telephone networks, cable networks, Local Area Networks ("LANs"), Wide Area Networks ("WANs"), and Metropolitan Area Networks ("MANs"). Further, the individual networks can be wireless networks, wired networks, or a combination thereof.

In an example, the PIM server computer 104 can receive emails for the user account of the user 124 from a plurality of sources. Merely as an example, FIG. 1 illustrates that the PIM server computer 104 can receive emails 152A for the user account of the user 124 from a trouble ticket system 136, emails 152B from a change management system 140, emails 152C from an e-commerce system 142, emails 152D from another PIM server computer 144, emails 152E from individual users 146A, . . . , 146N, and/or the like. The emails 152A-152E are referred to herein collectively as "emails 152". FIG. 1 illustrates only some examples of components from which the PIM server computer 104 can receive emails 152, although in other examples, the PIM server computer 104 can receive emails from any other appropriate system capable of transmitting emails to the PIM server computer 104 such as, but not limited to, package tracking systems, flight reservation tracking systems, and others.

In addition, as referenced above, emails or messages transmitted to the PIM server computer 104 are not limited to systems. User-generated emails can be sent to the PIM server computer 104, for example, related to the same, or a similar, topic, such as in relation to editing a document, discussing a particular issue, or deciding on a particular strategy. In this example, a number of emails on the same email thread may be generated and sent by a number of users. The PIM server computer 104 can analyze these emails and present to the users a consolidated message about the thread, such as the status indicated in the most recent email. For instance, if a number of users (e.g., users 124, 146A, . . . , 146N) are editing a document, the PIM server computer 104 may parse the latest message and determine the status that "John approved the draft with comments." Furthermore, in this example, the PIM server computer 104 may analyze the associated document for changes from the last version, such as redline changes in the document, and display those redline changes in addition to the status.

As discussed briefly above, the trouble ticket system 138 can allow a user (e.g., the user 124 or another user) to create a trouble ticket corresponding to an issue within an organization. The issue, for example, can be associated with a non-working component (e.g., a software component, a hardware component, or another component), a possible improvement of a component, or any appropriate issue within an organization. A trouble ticket can be a running report on a particular issue, and can have an assigned ID number (e.g., a trouble ticket number), data indicating a status of the trouble ticket, and possibly other relevant data.

Once a trouble ticket has been created, the trouble ticket system 136 can generate emails 152A associated with the trouble ticket. For example, the emails can be generated for each stage that the trouble ticket passes through. In an example, some or all of these emails can be generated automatically by the trouble ticket system 136, while in another example, some or all of these emails can be generated manually by personnel associated with the trouble ticket system 136. For example, emails can be generated when the trouble ticket is created, when an issue associated with the trouble ticket is assigned to a troubleshooting personnel, when the troubleshooting personnel generates an estimate as to how long it can take to address the issue, when the troubleshooting personnel first confront the issue, when the issue is resolved, and/or the like.

An email 152 can include data indicating a corresponding status 162 associated with the email. For example, data indicating a status 162A in an email 152A from the trouble ticket system 126 can indicate a status of an associated trouble ticket for which the email 152A is generated. In another example, data indicating a status 162B in an email 152B from the change management system 140 can indicate a status of an associated change management project for which the email 152B is generated. As discussed above, an email associated with a trouble ticket can also include a unique trouble ticket ID or some other unique data that identifies the trouble ticket. The ID number can be, for example, included in a subject line of the associated email. In another example, the ID number can be included in the text or body of the associated email.

In an example, emails associated with a specific trouble ticket (e.g., emails including the same trouble ticket number or ID number) are considered to be included in a same email thread associated with the trouble ticket. In an example, two emails associated with two different trouble tickets (e.g., emails including different trouble ticket numbers or ID numbers) are considered to be included in two different email threads associated with the two different trouble tickets. That is, an email thread associated with a trouble ticket comprises emails associated with the specific trouble ticket.

In an example, a trouble ticket email can also include data describing the current status of the associated trouble ticket. For example, if the trouble ticket email is generated to indicate that someone named "John" is assigned to work on the trouble ticket, the status can indicate that "John has been assigned to work on the trouble ticket." In an example, the status associated with a trouble ticket email can be specified in a special status field included in the associated email. In another example, the status associated with the trouble ticket email can be included in the subject, text or body of the associated email.

The emails in an email thread associated with a trouble ticket can be transmitted by the trouble ticket system 136 to email accounts of a user who reported the trouble ticket, one or more users responsible for attending the issue associated with the trouble ticket, a system administrator, a manager associated with managing the trouble ticket system 136, and/or a user otherwise associated with the trouble ticket. In an example, the user 124 is associated with multiple trouble tickets, and receives emails associated with these trouble tickets.

The trouble ticket system 136 can issue a large number of emails associated with a single trouble ticket. If the user 124 is to receive emails for multiple trouble tickets, such a large number of trouble ticket emails for the multiple trouble tickets can overwhelm the user. For example, the user can be interested in keeping track of the latest status of multiple trouble tickets. However, the user might have to read multiple trouble ticket emails in order to determine the current status of the trouble ticket.

In order to address these considerations, and potentially others, the PIM server application 108 can include a message parsing service 150. In an example, the message parsing service 150 monitors individual emails received by the PIM server computer 104 for the user account of the user 124. For example, the message parsing service 150 can parse and analyze an email to identify one or more characteristics of the email.

The message parsing service 150 can also receive one or more rules 166 that define the manner in which individual emails are to be parsed and analyzed. The rules 166, for example, can be defined by the user 124, an administrator of the trouble ticket system 136, an administrator of the PIM server computer 104, another user associated with the trouble ticket system 136, and/or the like.

If an email is received from the trouble ticket system 136 for the user 124, the message parsing service 150 can parse the email to identify at least an ID number associated with the email (which, for example, can be a trouble ticket number associated with the email generated by the trouble ticket system 136). As previously discussed herein, the ID number can be included in a subject line of the email, and the message parsing service 150 can identify the ID number from the subject line of the email. In another example, the ID number can be included in a specific field of the email, and the message parsing service 150 can identify the ID number from the specific field of the email. In yet another example, the ID number can be included in the text or body of the email. In such an example, the message parsing service 150 can perform a text search or character search of the email to identify the ID number. The rules 166, for example, can specify the structure and/or the location of the ID number in the email, which the message parsing service 150 can use to parse the email to identify the ID number associated with the email.

In an example, if an email is received from the trouble ticket system 136 for the user 124, the message parsing service 150 can parse and analyze the email to also identify data describing the status of the trouble ticket associated with the email. The status, for instance, can provide the status of the associated trouble ticket. In one configuration, the status can be included in a subject line of the email, and the message parsing service 150 can identify the status from the subject line of the email. In another configuration, the status can be included in a specific field of the email, and the message parsing service 150 can identify the status from the specific field of the email. In yet another configuration, the status can be included in the text or body of the email. In this example configuration, the message parsing service 150 can perform a text search or character search of the email to identify the status. The rules 166, for example, defines the structure and/or the location of the data defining the status associated with the email, using which the message parsing service 150 parses the email to identify the data indicating the status.

In addition to the ID number and the status, the message parsing service 150 can also identify one or more characteristics associated with individual emails received from the trouble ticket system 136. For example, the message parsing service 150 can also identify the date and time an email was received, a sender of the email, a receiver of the email, and/or the like.

In an example, the status notification service 148 can receive (e.g., from the message parsing service 150) the ID number and the status of individual emails received from the trouble ticket system 136. Based on the ID numbers and the status of individual emails, the status notification service 148 can generate or update a corresponding status notification message 156, and transmit the status notification message 156 to the client device 116. In an example, the status notification message 156 provides a latest status of one or more trouble tickets, as discussed in detail herein later.

Figure 2A:
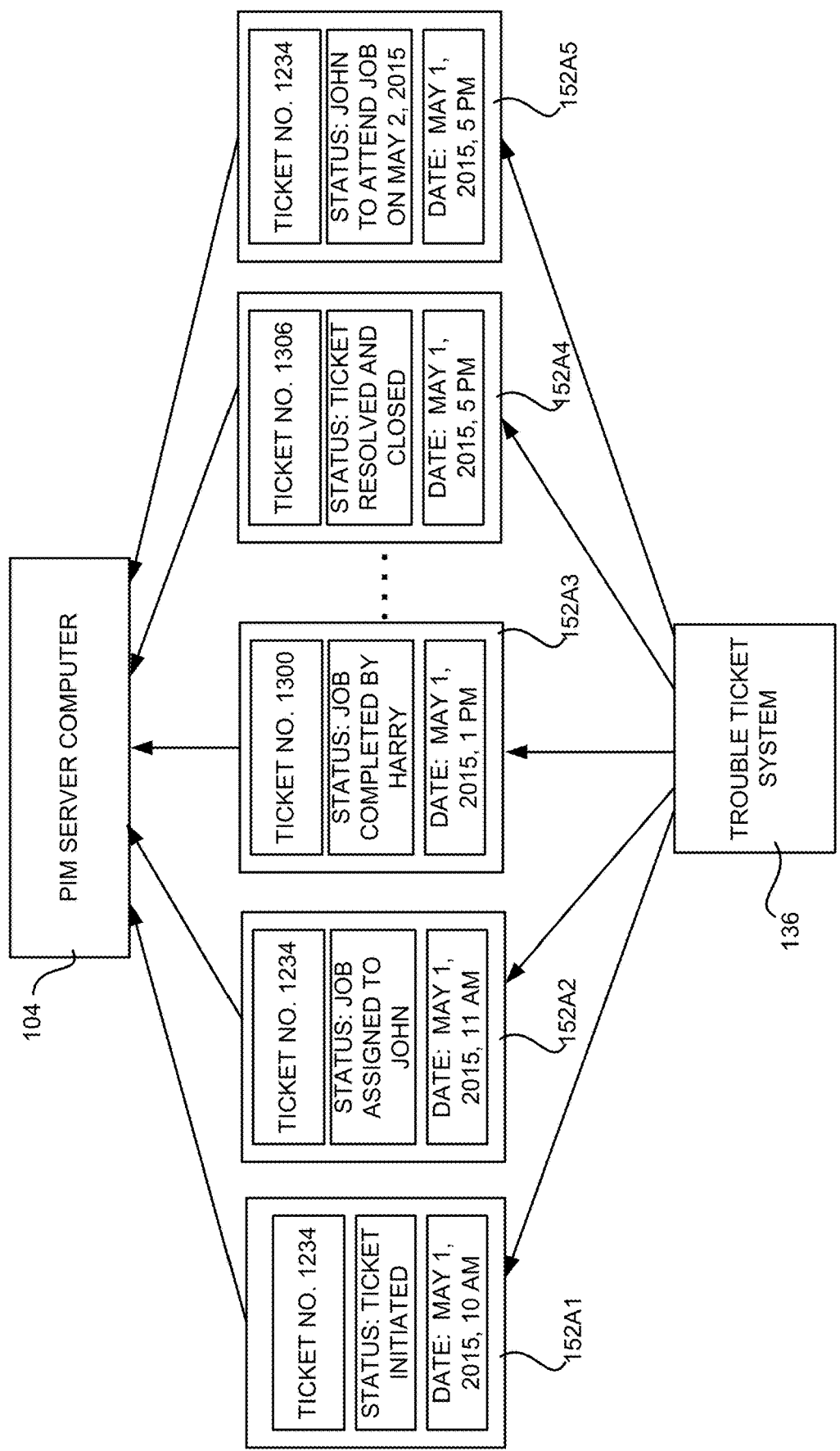
FIG. 2A is a computer system architecture diagram that illustrates example emails received by a personal information management ("PIM") server computer from a trouble ticket system for a user messaging account, according to one configuration disclosed herein.

FIG. 2A shows a UI that illustrates the content of example emails 152A1-152A5 received by the PIM server computer 104 from the trouble ticket system 136 for the user account of the user 124 in one specific example. FIG. 2A illustrates five example emails, although the PIM server computer 104 is likely to receive a larger number of emails from the trouble ticket system 136. For each email 152 of FIG. 2A, only the ID number (which, in the example of FIG. 2A, is the trouble ticket number, and is identified simply as "Ticket No." in FIG. 2A), the status, and the date and time are illustrated in FIG. 2A, although the emails 152 can include other relevant information.

As previously discussed herein, the message parsing service 150 can identify the ID number, the status, and the date and time of the emails. As illustrated in FIG. 2A, the emails 152 includes emails associated with example ticket numbers 1234, 1300 and 1306, which are received for the user account of the user 124.

Figure 2B:
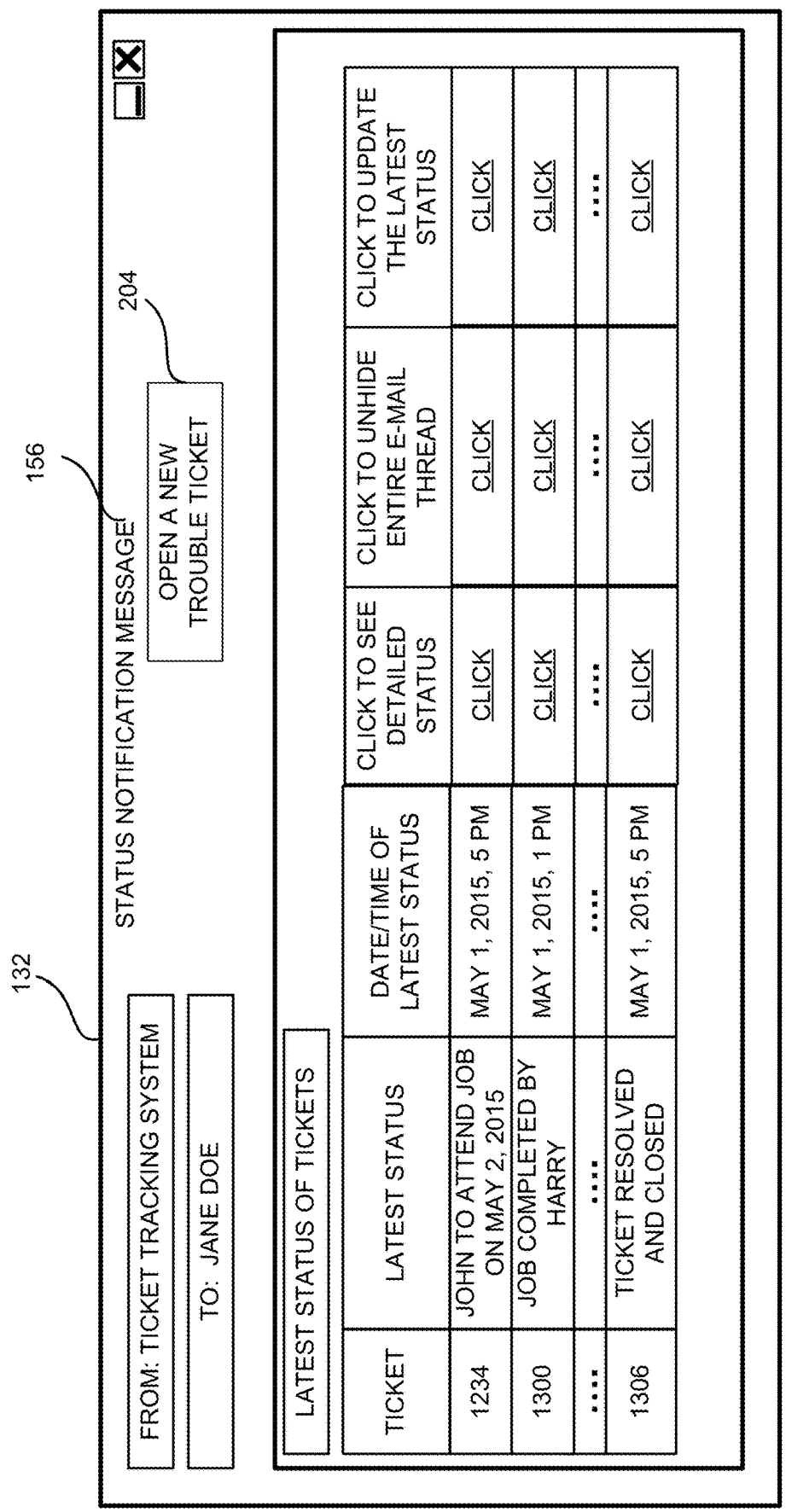
FIG. 2B is a UI diagram that illustrates an example status notification message that provides a simplified UI for viewing the current status of message threads, according to one configuration disclosed herein.

FIG. 2B is a UI diagram that illustrates an example status notification message 156. The status notification message 156 can be generated or updated by the status notification service 148, and can be transmitted to the client device 116. The PIM client application 120 can display the status notification message 156 in the email display UI 132 of FIG. 1 (or another UI that is different from the email display UI 132). The UI diagram of FIG. 2B can be displayed in a web browser, or can be displayed as a part of a user interface provided specifically by the PIM client application 120.

The example status notification message 156 of FIG. 2B is generated based on the emails 152A1-152A5 of FIG. 2A. In an example, the status notification message 156 provides data indicating the latest status of multiple trouble tickets. For example, and as illustrated in FIG. 2A, the emails 152A1-152A5 include emails associated with example ticket numbers 1234, 1300 and 1306. For the ticket number 1234, three emails were received at 10 AM, 11 AM and 5 PM, respectively. It is assumed that the status notification message 156 was generated or updated at or after 5 PM. Thus, the status notification message 156 includes the latest status of the ticket number 1234, i.e., the status of the email 152A5 associated with the ticket number 1234 that was received at 5 PM. For example, the email 152A5 associated with the ticket number 1234, which was received at 5 PM, is the latest email in the email thread for the ticket number 1234, and this email has a status of "John to attend job on May 2, 2015." Accordingly, the latest status of the trouble ticket 1234 included in the status notification message 156 indicates that "John to attend job on May 2, 2015."

Assume, for example, that another email (not illustrated in FIG. 2A) for the same email thread (i.e., having the same ID number or ticket number of 1234) is received at 5:12 PM, and has a status entry indicating "John to attend the job in the afternoon of May 2, 2015." Then the status notification message 156 will be updated at or after 5:12 PM, to indicate this as the latest status for the ticket number 1234. In an example, the status notification message 156 also includes latest status of various other ticket numbers. For example, the status notification message 156 includes the latest status for ticket numbers 1300 and 1306.

In addition to illustrating the latest status of a trouble ticket, the status notification message 156 can also provide options for displaying a detailed status of a trouble ticket and options for displaying emails associated with the trouble ticket. FIG. 2C is a UI diagram that illustrates a detailed status of the example trouble ticket 1234. For example, clicking an option to display the detailed status of the trouble ticket 1234 in the UI diagram of FIG. 2B results in display of the UI diagram of FIG. 2C. In another example and although not illustrated in FIG. 2C, the user 124 can request display of the detailed status of the trouble ticket 1234 by, for example, selecting the trouble ticket 1234 and then selecting the appropriate option, or the like.

As illustrated in FIG. 2A, the PIM server computer 104 receives three emails for the trouble ticket 1234. The UI diagram of FIG. 2C illustrates the status of each of these three emails, and also illustrates the date and time of receiving these three emails. The UI diagram of FIG. 2C also provides options to unhide or show individual emails associated with the trouble ticket 1234, and to delete individual emails associated with the trouble ticket 1234. Selecting one of these options would result in display of the underlying email (e.g., one of the emails 152A1-152A5 of FIG. 2A) associated with the corresponding status, or deleting the underlying email associated with the corresponding status.

In the example of FIG. 2B, the status notification message 156 displays the latest status of multiple trouble tickets, and the underlying emails are hidden from the user 124. That is, for example, the PIM client application 120 might not display these emails in the inbox portion of the email display UI 132. In an example, the underlying emails can be stored by the PIM server computer 104 (e.g., in the mailbox data store 112) and/or stored in the client device 116, but be marked as being hidden, to prevent the PIM client application 120 from displaying these emails in the inbox portion of the email display UI 132. In another example, the underlying emails can be stored by the PIM server computer 104, but not transmitted by the PIM server computer 104 to the client device 116, so that the PIM client application 120 might be unable to display these emails in the inbox portion of the email display UI 132. The emails can be un-hidden (i.e., displayed to the user 124) based on the user 124 requesting to view the emails (e.g., by selecting one of the links in FIG. 2C, as discussed herein above). As and when new emails associated with the trouble ticket number 1234 arrive, the UI diagram of FIGS. 2B and 2C can be updated in real or near-real time.

As discussed, the status notification message 156 is updated (e.g., by the PIM server application 108) each time the user 124 receives an email from the trouble ticket system 136. In an example, each time the status notification message 156 is updated, the status notification message 156 is "pushed" by the PIM server computer 104 to the PIM client application 120, or is "pulled" by the PIM client application 120 from the PIM server computer 104. In an example, after the status notification message 156 is updated, when the PIM client application 120 synchronizes with the PIM server computer 104, the updated status notification message 156 is transmitted from the PIM server computer 104 to the PIM client application 120. Subsequently, the user 124 can view the updated status notification message 156.

In an example, once the status notification message 156 is updated, the updated status notification message 156 can be displayed as being unread (e.g., is displayed as an unread email) within an UI of the PIM client application 120, until the user 124 views the updated status notification message 156. In an example, the status notification message 156 can be displayed in the visual format of an email within the PIM client application 120. In another example, the status notification message 156 can be displayed in a format that is different than the visual format used for displaying emails. For example, the PIM client application 120 can display a UI control specifically for viewing status notification messages within the email display UI 132, the selecting of which will display the status notification message 156 using the UI diagram of FIG. 2B.

In an example, the status notification message 156 displayed in the UI diagram of FIG. 2B can provide one or more UI controls and/or options associated with trouble tickets (e.g., using which the user 124 can directly interface with the trouble ticket system 136). For example, as illustrated in FIG. 2B, the status notification message 156 displayed in the UI diagram of FIG. 2B includes a UI control 204 to open a new trouble ticket. In an example, the UI control 204 can provide a hyperlink to a website (e.g., which can be provided by the trouble ticket system 136) in which the user can define a new trouble ticket.

Selecting the UI control 204 can, for example, load the website in a web browser application executing on the client device. In another example, selecting the UI control 204 can open a new UI (not illustrated in the figures), through which the user can directly input a new trouble ticket. An application programming interface ("API") can interface between the PIM client application 120 and the trouble ticket system 136, through which the UI control 204 can transmit information to the trouble ticket system 136 to open the UI for defining the new trouble ticket.

In an example, the status notification message 156 displayed in the UI diagram of FIG. 2B can provide the user 124 options to update the latest status of individual trouble tickets. For example, the option to update the latest status of a trouble ticket can provide a hyperlink to a website (e.g., which can be maintained by the trouble ticket system 136) in which the user can update the latest status of the trouble ticket. In another example, selecting the option can open a new UI, through which the user can directly update the latest status of the trouble ticket system. In an example, updating the status of the trouble ticket can result in the trouble ticket system 136 generating and transmitting an email (e.g., to all users associated with the trouble ticket) with the latest status (i.e., generate and transmit a new trouble ticket email with the latest status).

FIG. 2B shows a UI illustrating various options provided by the status notification message 156. In an example, the status notification message 156 can provide one or more other options as well. For instance, the status notification message 156 can provide the user 124 with UI controls to approve the latest status of individual trouble tickets, edit the latest status of individual trouble tickets, and/or the like.

In the example of FIG. 2B, the status notification message 156 displays data indicating the latest status of multiple trouble tickets. That is, the status notification message 156 provides a consolidated view of the latest status of multiple trouble tickets. In another example, instead of a single status notification message displaying latest status of multiple trouble tickets, multiple status notification messages can be displayed, each status update message associated with a latest status of a corresponding thread, as discussed with respect to FIGS. 3A-3C herein below.

Figure 3A:
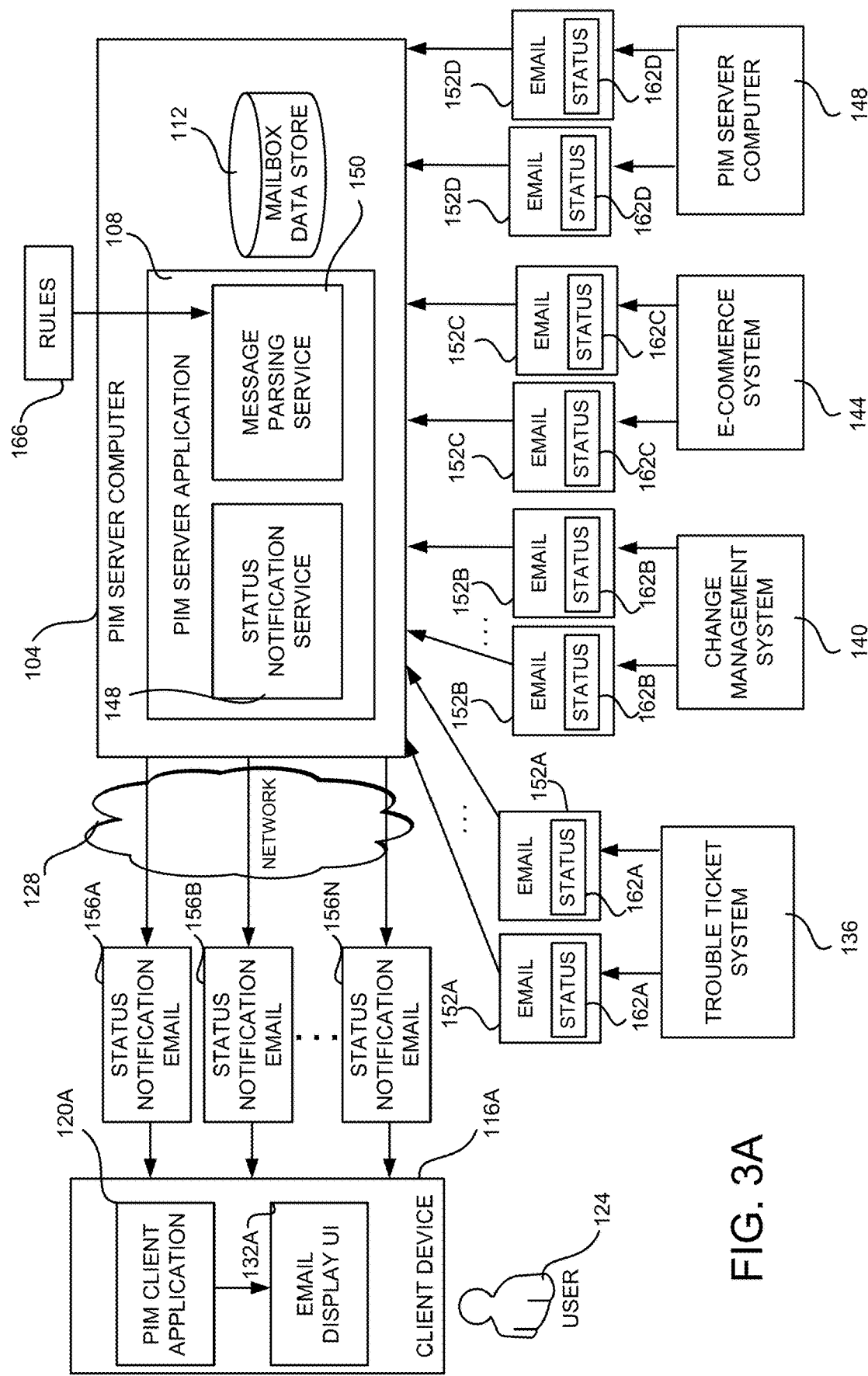
FIG. 3A is a computer system architecture diagram showing aspects of the configuration and operation of several components described herein for providing a UI for viewing the current status of message threads, according to one configuration disclosed herein.

FIG. 3A is a system architecture diagram showing aspects of the configuration and operation of several components described herein for providing status updates for email threads. The system architecture diagram of FIG. 3A is similar to that of FIG. 1. However, in the system architecture diagram of FIG. 3A, the PIM server computer 104 generates, updates and transmits multiple status notification emails 156A-156N to the client device 116, where each status notification email provides latest status of a corresponding email thread associated with an associated trouble ticket.

Furthermore, in the system architecture diagram of FIG. 3A, the client device 116, the PIM client application 120 and the email display UI 132 are replaced by a client device 116A, a PIM client application 120A and an email display UI 132A, respectively. The PIM client application 120A of FIG. 3A can be different from the PIM client application 120 of FIG. 1 (although, in an example, the client device 116 of FIG. 1 and the client device 116A of FIG. 3A can be the same client device), which will be discussed in detail herein later.

Figure 3B:
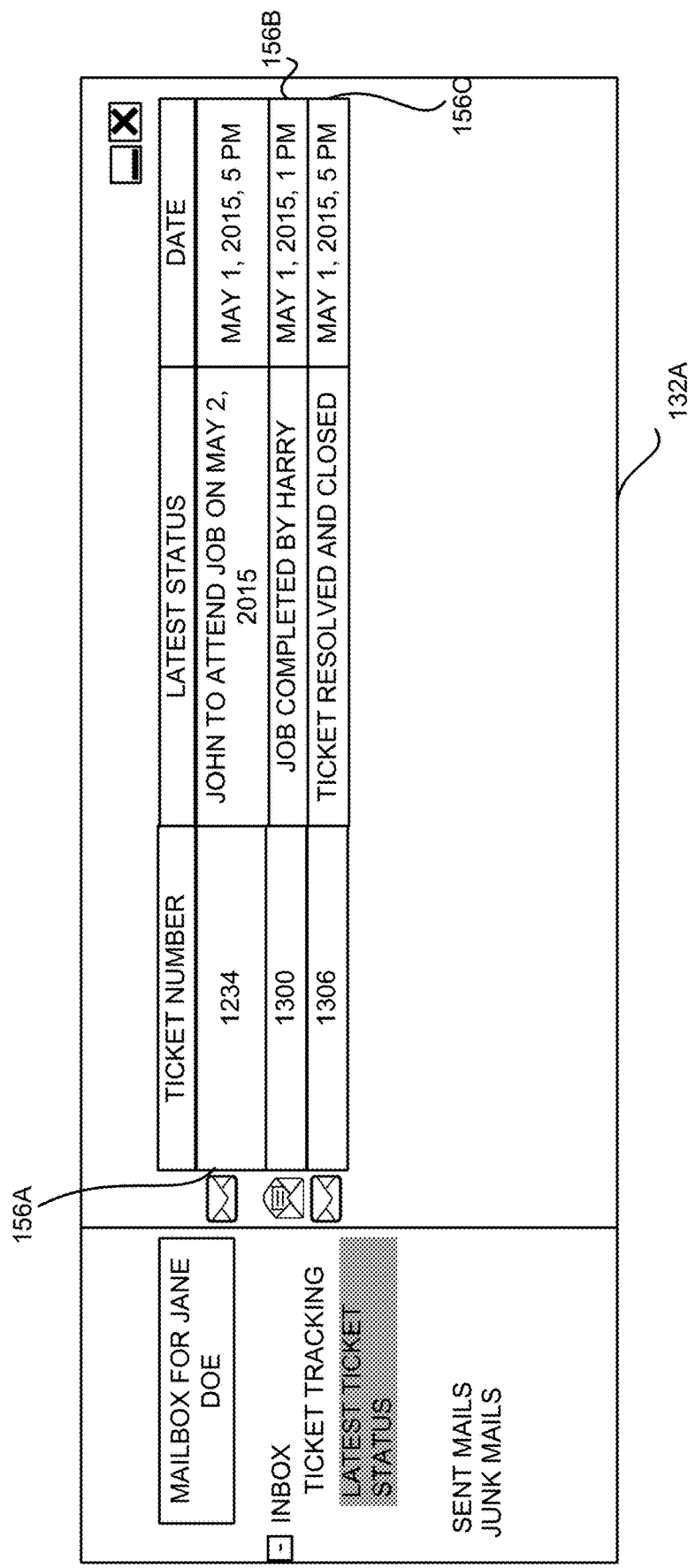
FIG. 3B is a UI diagram illustrating an illustrative message display UI, which shows several status notification messages, according to one configuration disclosed herein.

FIG. 3B illustrates an UI diagram illustrating the email display UI 132A, which illustrates some of the fields of the status notification emails 156A-156C. The status notification emails 156A-156C respectively represent latest status of the trouble tickets 1234, 1300 and 1306 of FIG. 2A. The UI diagram of FIG. 3B is displayed by the PIM client application 120A, e.g., for displaying emails to the user 124 on the client device 116.

In an example, the status notification emails 156A-156N are, for example, generated, updated and transmitted by the PIM server computer 104 to the PIM client application 120A. The PIM server computer 104 can generate and update the status notification emails 156A-156N such that the status notification emails include one or more special fields (e.g., which are not generally available in regular emails).

For example, the status notification emails 156A-156N can include an ID field (which, in FIG. 3B, is titled or labeled as a "Ticket Number" field). For example, the status notification email 156A illustrates a latest status of the trouble ticket 1234 (i.e., illustrates a status of a latest email in an email thread associated with the trouble ticket 1234). Accordingly, the ID field or the "Ticket Number" field for the status notification email 156A indicates 1234.

The status notification emails 156A-156N can also include a "latest status" field. For example, the status notification email 156A illustrates a latest status of the trouble ticket 1234. As discussed with respect to FIG. 2A, the latest status for this trouble ticket is "John to attend job on May 2, 2015." Accordingly, in FIG. 3B, the "latest status" field for the status notification email 156A indicates "John to attend job on May 2, 2015."

In the example of FIG. 3B, the user 124 configures the PIM client application 120 (e.g., defines a rule within the PIM client application 120) such that status notification emails are stored in a specific folder (e.g., which is named the "Latest ticket status" in FIG. 3B, although any other name can also be used). For example, the user 124 can specific a rule that if an email includes a non-zero value for the "latest status" field, the email should be stored in the "Latest ticket status" folder. In an example, the email can be stored automatically in the "Latest ticket status" folder when received, without the user 124 needed to manually storing the email in the "Latest ticket status" folder.

The user 124 can also configure the "Latest ticket status" folder such that the special fields of the status notification emails are displayed. For example, the user 124 can configure the "Latest ticket status" folder such that the ID field and the "latest status" field (along with, for example, a date field) are displayed while the user views the "Latest ticket status" folder.

In the example of FIGS. 3A and 3B, whenever the PIM server computer 104 receives an email from the trouble ticket system 136 that is associated with the trouble ticket 1234, the PIM server computer 104 updates the status notification email 156A (e.g., deletes the previous version of the status notification email 156A, and stores the latest version of the status notification email 156A and marks it as unread). The PIM client application 120A receives the updated status notification email 156A, and displays the updated status notification email 156A as being unread. The user 124 sees the status notification email 156A as being unread, and identifies the update of the latest status of the trouble ticket 1234. In the example of FIG. 3B, the status notification emails 156A and 156C are illustrated as being unread, while the status notification email 156B is illustrated as being read.

As illustrated in FIG. 3B, the status notification email 156A can display the latest status of the trouble ticket 1234. A body of the status notification email 156A (e.g., which can be opened by selecting and opening the status notification email 156A) can include, for example, the latest status of the trouble ticket 1234. In another example, the body of the status notification email 156A can include a detailed status of the trouble ticket 1234 (e.g., similar to FIG. 2C).

FIG. 3C illustrates an UI diagram illustrating the email display UI 132A, which illustrates detailed status of multiple trouble tickets. The PIM server computer 104 can transmit the emails 152 of FIG. 2A to the PIM client application 120A. The user 124 can configure the PIM client application 120A (e.g., define rules within the PIM client application 120A) so that such emails are stored in a specific folder (e.g., which is labeled as "Ticket Tracking" in FIG. 3C, although any other appropriate name of the folder can also be possible).

If the user 124 prefers to view details of the emails 152 associated with one or more trouble tickets, the user 124 can open the "Ticket Tracking" folder and view all the emails associated with the trouble tickets. In an example, the PIM server computer 104 can modify the emails 152 such that these emails have specific fields, e.g., an ID field (e.g., which is labeled as "Ticket Number in FIG. 3C) and a status field. The user 124 can configure the "Ticket Tracking" folder such that this folder displays these special fields.

For example, as illustrated in FIG. 2A, three emails 152A1, 152A2 and 152A5 associated with the trouble ticket 1234 are received at 10 AM, 11 AM and 5 PM, respectively. FIG. 3C illustrates these emails, with the status of these emails displayed in the status field. In an example, clicking one of the emails of FIG. 3C can display the actual email (e.g., one of the actual emails 152A1, 152A2 or 152A5 of FIG. 2A received by the PIM server computer 104).

It is to be noted that an original email 152 might not include the "status" field and/or the "ticket number" field. However, the PIM server application 108 can parse this email to identify these fields, append these fields in the email 152, and transmit the appended email to the client device such that the email 152 is displayed on the client device 116 along with these fields, as illustrated in FIG. 3C. Thus, an email displayed in the UI diagram of FIG. 3C illustrates a corresponding status and a ticket number associated with the email.

Although FIG. 3C illustrates the Inbox of the user 124 including individual emails of various email threads and the detailed status of various email threads, in another example, the client device 116A of FIG. 3A does not originally display the individual emails and the detailed status of various email threads. For example, the PIM server computer 104 originally may not transmit individual emails of a message thread to the client device 116A. For example, the user 124 can request displaying individual emails of a message thread (e.g., by selecting an option or a hyperlink in a status notification email 156A displayed in FIG. 3B). In response, the individual emails of the message thread (e.g., which displays the detailed status of the message threads) can be transmitted by the PIM server computer 104 to the client device 116A. The client device 116A then can display these individual emails, as illustrated in FIG. 3C.

In the example of FIGS. 1, 2B and 2C, the PIM client application 120 can be configured to display the status notification message 156. As discussed previously, the status notification message 156 can be presented using a visual format that is different from the visual format utilized to present a regular email. For example, the status notification message 156 can have hyperlinks or fields, which, when selected or clicked, can result in the UI diagram of FIG. 2C illustrating the detailed status of a trouble ticket. For the PIM application 120 to have abilities to display the status notification message 156, selectively hiding or un-hiding the underlying emails 152, display the detailed status report, etc., the PIM application 120 can have to be accordingly developed or coded. However, it might not be possible or feasible to develop a third party PIM client application in such a manner.

Therefore, in order to display the UI diagrams of FIGS. 3B and 3C, no special development of the PIM client application 120A is necessary. For example, to display the special fields in FIGS. 3B and 3C, the PIM client application 120A can be easily customized to display some special fields while viewing a specific folder. Such customization can be readily offered by many major third party PIM clients applications.

Thus, when a PIM client application (e.g., the PIM client application 120 of FIG. 1) is specifically developed to display status notification messages, the UI diagrams of FIGS. 2B and 2C are used to display the status notification message 156. However, when specific development of the third party PIM client application might not be feasible or practical, the PIM client application 120A of FIG. 3A can be used, e.g., to display the status notification emails 156A-156N of FIGS. 3A-3C.

Although FIGS. 1, 2A-2C and 3A-3C are discussed with respect to emails associated with trouble tickets (e.g., emails generated by the trouble ticket system 136), the technologies disclosed herein can be utilized in other environments as well. For example, the change management system 140 of FIGS. 1 and 3A can generate emails directed to the user 124. For example, multiple emails can be generated by the change management system 140 for a single project, and the PIM server application 104 can track these emails to generate a status notification message or a status notification email, for notifying the latest status of the project to the user 124.

In another example, the e-commerce system 142 of FIGS. 1 and 3A can generate emails directed to the user 124. For example, multiple emails can be generated by the e-commerce system 140 for a single project, and the PIM server application 104 can track these emails to generate a status notification message or a status notification email, for notifying the latest status of the project to the user 124.

In yet another example, individual users 146A, . . . , 146N can generate emails directed to the user 124. For example, multiple emails can be generated by individual users for a single topic (e.g., for editing a document, discussing a particular issue, or deciding on a particular strategy), and the PIM server application 104 can track these emails to generate a status notification message or a status notification email, for notifying the latest status of the topic to the user 124. As an example, a number of emails on the same email thread may be generated and sent by a number of users. The PIM server computer 104 can analyze these emails and present to the users a consolidated message about the thread, such as the status indicated in the most recent email. For instance, if a number of users (e.g., users 124, 146A, . . . , 146N) are editing a document, the PIM server computer 104 may parse the latest message and determine the status to be "John approved the draft with comments." Furthermore, in this example, the PIM server computer 104 may analyze the associated document for changes from the last version, such as redline changes in the documents, and display those redline changes in addition to (or instead of) the status.

It should also be appreciated that while the technologies illustrated in FIGS. 1-3C and discussed above are directed to providing latest status for emails 152, the technologies disclosed herein can also be used for providing the latest status for other types of messages as well, e.g., text messages, Short Message Service ("SMS"), Multimedia Messaging Service ("MMS"), postings on a social networking website, and/or the like. For example, at least some of the emails 152 of FIGS. 1-3C can be replaced by text messages, SMS, MMS, postings on a social networking website, or other types of messages.

Figure 4A:
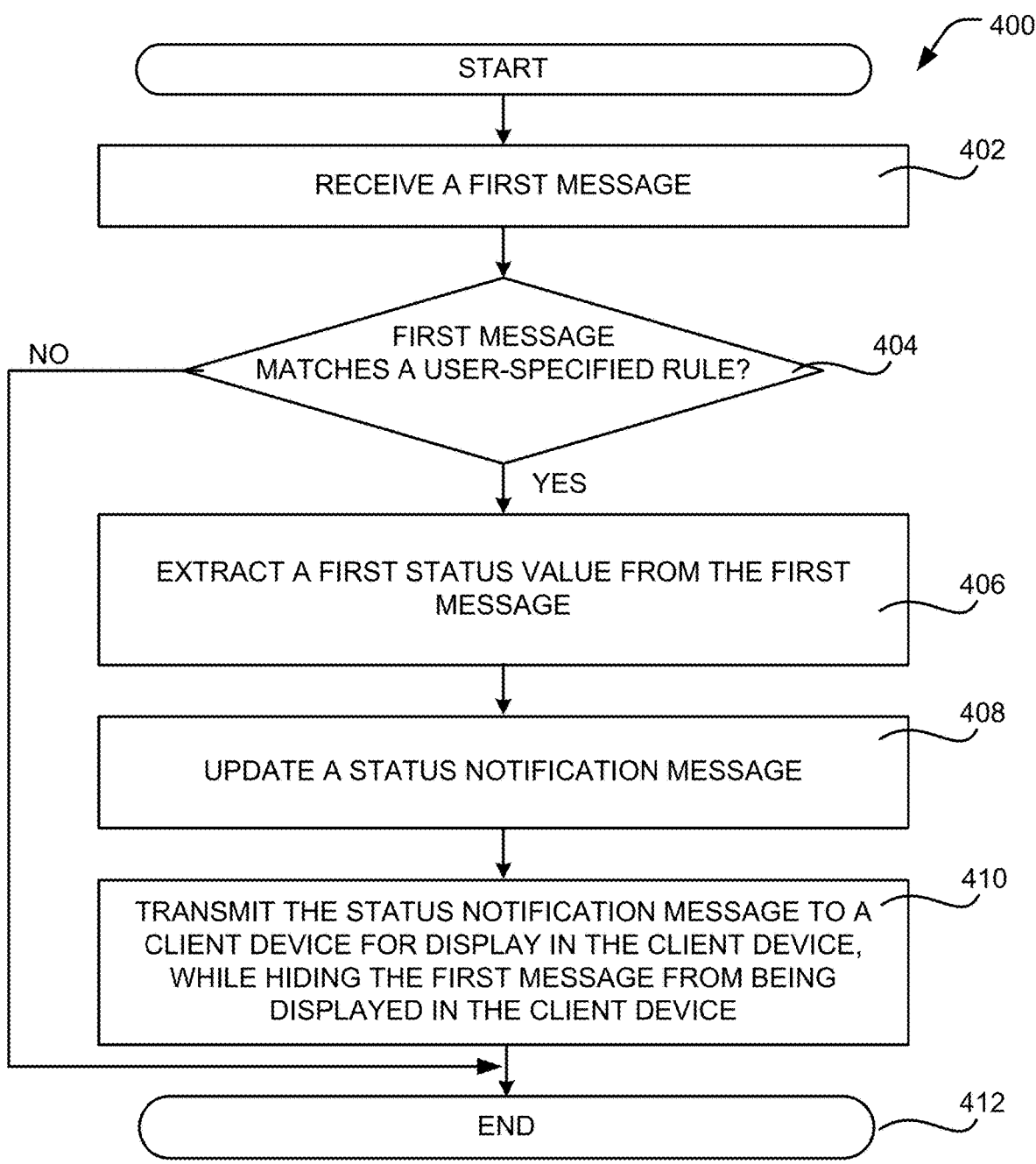
FIGS. 4A-4B are flow diagrams showing several routines that illustrate aspects of the operation of several mechanisms disclosed herein for updating a status notification message that provides the current status of email threads, according to one configuration disclosed herein.

FIG. 4A is a flow diagram showing a routine 400 that illustrates aspects of the operation of one mechanism disclosed herein for updating a status notification message that provides the current status of email threads, according to one configuration disclosed herein. It should be appreciated that the logical operations described herein with respect to FIG. 4A, and the other FIGS. (e.g., FIG. 4B discussed below), can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 400 begins at operation 402, where the PIM server computer 104 receives a first message. In an example, the first message is an email message (e.g., one of the emails 152A1-152A5 of FIG. 2A).

The routine 400 then proceeds from operation 402 to 404, where the PIM server application 108 (e.g., the message parsing service 150) determines if the first message matches one or more user-specified rules (e.g., rules 166). For example, the rules 166 can require that the message parsing service 150 parse messages that are from the trouble ticket system 136 and directed to the user 124. In such an example, the message parsing service 150 can utilize the rules 166 to determine if the first message is from the trouble ticket system 136 and directed to the user 124.

In response to determining that the first message matches the user-specified rule (e.g., in response to the first message being received from the trouble ticket system 136 and being directed to the user 124), i.e., in response to a "Yes" at operation 404, the routine 400 proceeds from operation 404 to operation 406. At operation 406, the PIM server application 108 (e.g., the message parsing service 150) parses the first message and extracts a first status value from the first message. The PIM server application 108 can also extract a ID number of the first message, which, for example, can be a trouble ticket number associated with the first message. In an example, extraction of the ID number and the first status value from the first message can be based on the user-specified rules. The ID number of the first message, for instance, can be extracted from the subject line of the message, a specific field of the message, or by doing a text search in the body of the message. Similarly, the first status value of the message, for example, can be extracted from the subject line of the message, a specific field of the message, or by doing a text search in the body of the first message.

The routine 400 then proceeds from operation 406 to operation 408, where the PIM server application 108 (e.g., the status notification service 148) updates a status notification message (e.g., the status notification message 156 of FIGS. 1 and 2B). In an example, the ID number of the first message can indicate that the first message is included in a first message thread, and the status notification message 156 can provide the latest status of the first message thread. The status notification message can be updated to include the first status value extracted from the first message. For instance, while updating the status notification message, the first status value extracted from the first message can replace an older status value of the status notification message.

The routine 400 then proceeds from operation 408 to operation 410, where the PIM server application 108 (e.g., the status notification service 148) transmits the status notification message to a PIM client application (e.g., the PIM client application 120) running in a client device (e.g., the client device 116), e.g., for display in the client device 116. In an example, the PIM server application 108 can mark the first message as being hidden, such that the PIM client application 120 does not display the first message in the client device. The routine then ends at operation 412.

Also, if, at 404, the first message does not match the user-specified rule, e.g., if the first message is not from the trouble ticket system 136 and/or not directed to the user 124 (i.e., if "No" at 404), then the routine 400 ends at operation 412.

Figure 4B:
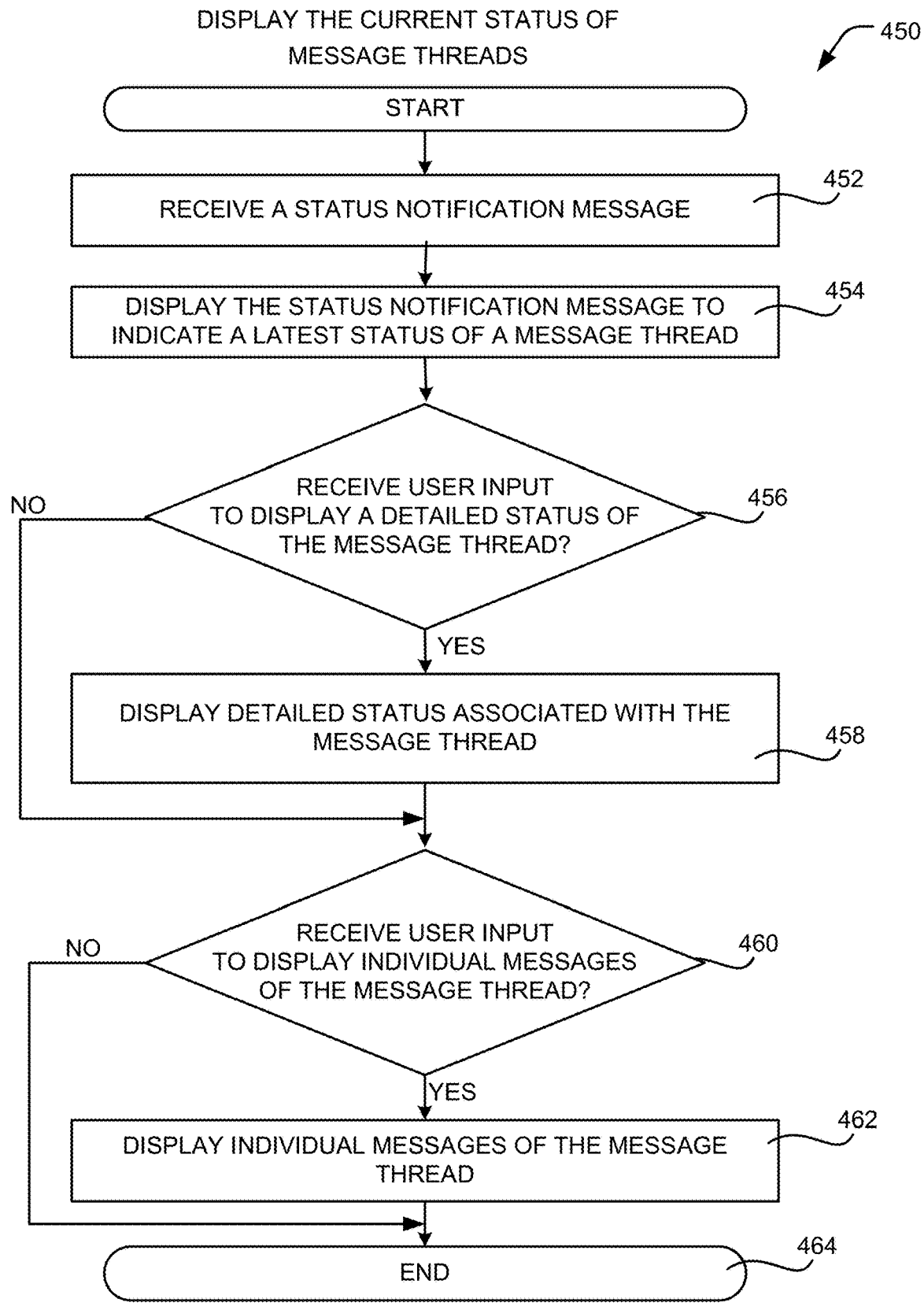

FIG. 4B is a flow diagram showing a routine 450 that illustrates aspects of the operation of one mechanism disclosed herein for displaying the current status of message threads, according to one configuration disclosed herein. The routine 450 begins at operation 452, where a PIM client application (e.g., the PIM client application 120) running on a client device receives a status notification message (e.g., the status notification message 156). The status notification message can be received from a PIM server application (e.g., the PIM server application 108). The status notification message can be transmitted by the PIM server application to the PIM client application at, for example, 410 of the routine 400 of FIG. 4A.

The routine 450 then proceeds from operation 452 to operation 454, where the PIM client application 120 displays the status notification message on the client device. The status notification message can indicate the latest status of a message thread. In an example, the message thread is associated with a trouble ticket, and the status notification message indicates the latest status of the trouble ticket. In another example, the status notification message indicates the latest status of multiple trouble tickets (i.e., indicates the latest status of multiple message threads). The status notification message can be displayed in an appropriate UI within a web browser running on the client device, or can be displayed as a part of a user interface provided specifically by the PIM client application. FIG. 2B illustrates an example display of the status notification message.

The status notification message can provide one or more UI controls. For example, selecting a first UI control can display a detailed status of the message thread, selecting a second UI control can display the underlying messages associated with the status notification message, and/or the like, as previously discussed herein in detail with respect to FIGS. 2B and 2C.

The routine 450 then proceeds from operation 454 to operation 456, where the PIM client application 120 determines if user input has been received to display a detailed status of the message thread. For example, the user 124 can select a UI control within the displayed status notification message to request display of the detailed status of the message thread.

If "Yes" at operation 450 (e.g., in response to the user selecting the appropriate UI control), the routine 450 then proceeds from operation 454 to operation 456, where the PIM client application 120 displays the detailed status associated with the message thread. For example, the message thread can include multiple messages, and status of individual messages of the message thread can be displayed, as discussed with respect to FIG. 2C.

The routine 450 then proceeds from operation 458 to operation 460, where the PIM client application 120 determines if user input has been received to display individual messages of the message thread. For example, the individual messages of the message thread can be originally hidden from the user (e.g., marked as hidden, and not displayed on the client device), but stored in the mailbox data store 112 in the PIM serer computer 104. The user 124 can select a UI control within the displayed status notification message to request display of the individual messages.

If "Yes" at operation 460 (e.g., in response to the user selecting the appropriate UI control), the routine 450 then proceeds from operation 460 to operation 462, where the PIM client application 120 displays the individual messages of the message thread, as discussed with respect to FIGS. 2B and 2C. The routine 450 then proceeds from operation 462 to operation 464, where the routine 450 ends. Also, if "No" at operation 456, the routine 450 proceeds from operation 456 to operation 460. Also, if "No" at operation 460, the routine 450 proceeds from operation 460 to operation 464.

Figure 5:
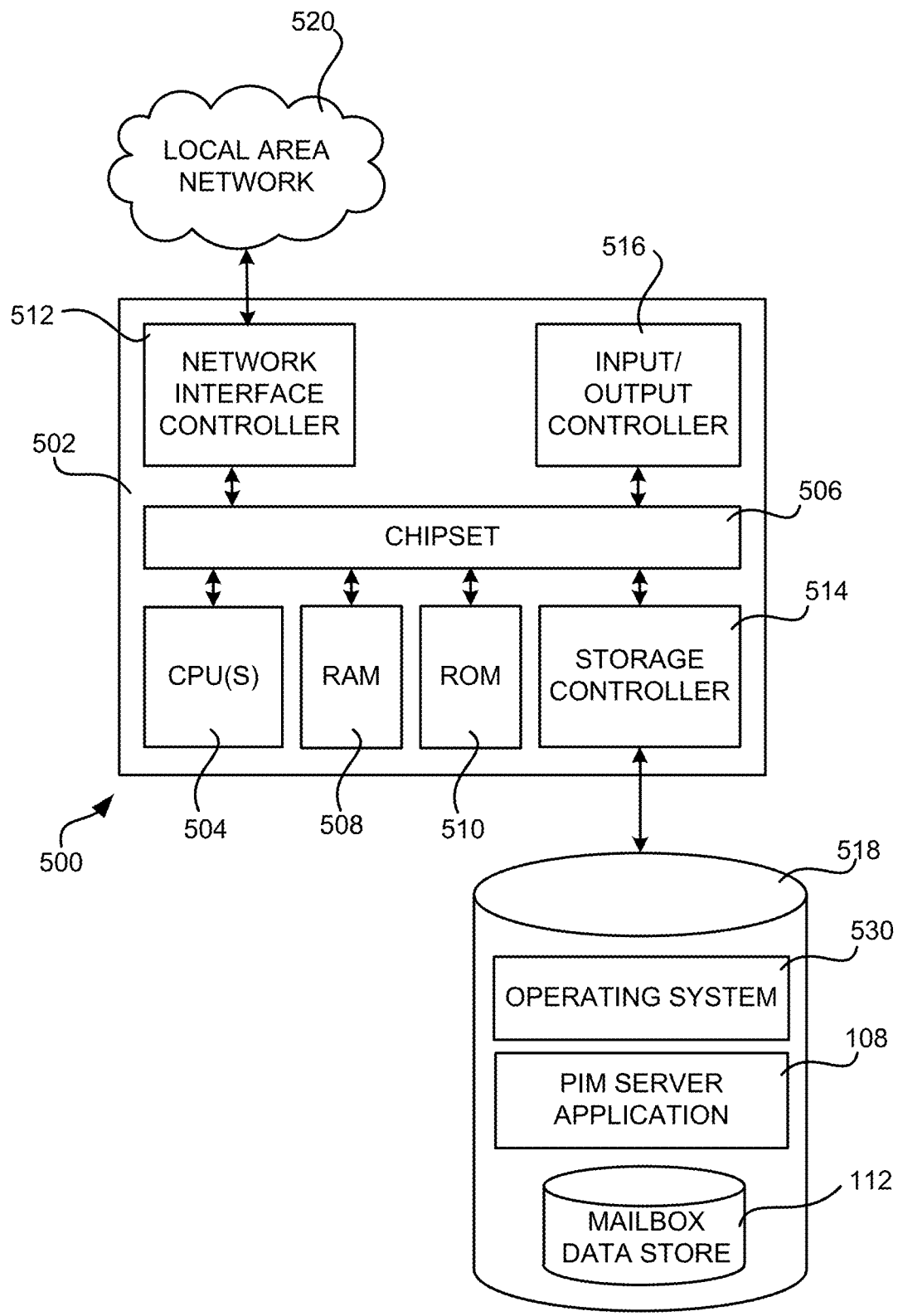
FIG. 5 shows an example computer architecture for a computer capable of executing the program components described herein providing status updates for email threads.

FIG. 5 shows an example computer architecture for a computer 500 capable of executing the program components described above for providing a UI for viewing the current status of message threads. The computer architecture shown in FIG. 5 illustrates a conventional server computer, workstation, desktop computer, laptop, tablet, network appliance, personal digital assistant ("PDA"), e-reader, digital cellular phone, or other computing device, and can be utilized to execute any of the software components presented herein. For example, the computer architecture shown in FIG. 5 can be utilized to execute the PIM server application 108 described above on a PIM server computer in the system architecture of FIG. 1.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the local area network 520. The chipset 506 can include functionality for providing network connectivity through a NIC 512, such as a gigabit Ethernet adapter. The NIC 512 is capable of connecting the computer 500 to other computing devices over the network 520. It should be appreciated that multiple NICs 512 can be present in the computer 500, connecting the computer to other types of networks and remote computer systems.

The computer 500 can be connected to a mass storage device 518 that provides non-volatile storage for the computer. The mass storage device 518 can store system programs, application programs, other program modules, and data, which have been described in greater detail herein. The mass storage device 518 can be connected to the computer 500 through a storage controller 514 connected to the chipset 506. The mass storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the mass storage device 518 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 518 is characterized as primary or secondary storage, and the like.

For example, the computer 500 can store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the mass storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. As used herein, the term computer-readable storage media does not encompass transitory signals per se.

The mass storage device 518 can store an operating system 530 utilized to control the operation of the computer 500. According to one configuration, the operating system comprises the LINUX operating system. According to another configuration, the operating system comprises the WINDOWS® SERVER operating system from MICROSOFT Corporation. According to further configurations, the operating system can comprise the UNIX operating system. It should be appreciated that other operating systems can also be utilized. The mass storage device 518 can store other system or application programs and data utilized by the computer 500, such as PIM server application 108, the mailbox data store 112 and/or any of the other software components and data described above. The mass storage device 518 might also store other programs and data not specifically identified herein.

In one configuration, the mass storage device 518 or other computer-readable storage media is encoded with computer-executable instructions which, when loaded into the computer 500, transform the computer from a general-purpose computing system into a special-purpose computer capable of implementing the configurations described herein. These computer-executable instructions transform the computer 500 by specifying how the CPUs 504 transition between states, as described above. According to one configuration, the computer 500 has access to computer-readable storage media storing computer-executable instructions which, when executed by the computer 500, perform the various routines described above with regard to FIG. 4. The computer 500 might also include computer-readable storage media for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, the input/output controller 516 can provide output to a display, such as a computer monitor, a flat-panel display, a digital projector, a printer, a plotter, or other type of output device. It will be appreciated that the computer 500 might not include all of the components shown in FIG. 5, can include other components that are not explicitly shown in FIG. 5, or might utilize an architecture completely different than that shown in FIG. 5.

Based on the foregoing, it should be appreciated that technologies for providing a UI for viewing the current status of email threads have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus comprising:
   a processor; and
   a non-transitory computer-readable storage medium having instructions stored thereon which are executable by the processor and which, when executed, cause the apparatus to:
   receive, on behalf of a client device, a first message from a trouble ticket system that is different from the apparatus, wherein the first message is a first e-mail message generated by the trouble ticket system configured to report a first trouble ticket status value to a user of the client device;
   identify one or more rules associated with the first message, the one or more rules utilized by the apparatus to analyze the first message;
   determine, based at least in part on the one or more rules, a first location in the first message associated with the first trouble ticket status value;
   extract, based at least in part on the first location, the first trouble ticket status value associated with the first message;
   generate, based at least on receiving the first message and extracting the first trouble ticket status value, a consolidated status notification that includes the first trouble ticket status value, wherein the consolidated status notification includes a generated e-mail message;
   display the consolidated status notification on a user interface other than an email message, the user interface including the first trouble ticket status value;
   receive, subsequent to generating the user interface and on behalf of the client device, a second message from the trouble ticket system, wherein the second message is a second e-mail message generated by the trouble ticket system configured to report a second trouble ticket status value to the user of the client device;
   determine, based at least in part on the one or more rules, that the second message is associated with the first message;

determine, based at least in part on the one or more rules, a second location in the second message of the second trouble ticket status value;

extract the second trouble ticket status value from the second location; and update, based at least in part on receiving the second message and the second trouble ticket status value, the user interface by replacing, in the user interface, first information associated with the first trouble ticket status value with second information associated with the second trouble ticket status value thereby generating an updated user interface that displays the second trouble ticket status value without display of an entirety of the second message.

2. The apparatus of claim 1, wherein the instructions, when executed, further cause the apparatus to:

subsequent to generating the consolidated status notification, transmit the user interface to the client device; and subsequent to updating the user interface, transmit the updated, user interface to the client device.

3. The apparatus of claim 2, wherein the instructions, when executed, further cause the apparatus to refrain from transmitting the first message and the second message to the client device, so that the first message and the second message are not displayed in the user interface of the client device.

4. The apparatus of claim 1, wherein the second message is received subsequent to the first message, and wherein the instructions, when executed, further cause the apparatus to:

determine that the first message and the second message are associated with a same trouble ticket; and in response to determining that the first message and the second message are associated with the same trouble ticket, generate the consolidated status notification such that the consolidated status notification includes the second trouble ticket status value and does not include the first trouble ticket status value.

5. The apparatus of claim 1, wherein the instructions, when executed, further cause the apparatus to:

determine that the first message is associated with a first trouble ticket and the second message is associated with a second trouble ticket that is different from the first trouble ticket; and in response to determining that the first message is with the first trouble ticket and the second message is associated with the second trouble ticket different from the first trouble ticket, generate the consolidated status notification to include both the first trouble ticket status value and the second trouble ticket status value.

6. The apparatus of claim 1, wherein the instructions, when executed, cause the apparatus to extract the first trouble ticket status value from the first message by reading the latest status from the first message.

7. The apparatus of claim 1, wherein the apparatus is a personal information manager (PIM) that is associated with the client device, the PIM different from the trouble ticket system.

8. A computer-implemented method comprising:

receiving, by a personal information manager (PIM) and from a system that is different from the PIM, a first plurality of messages of a first message thread and a second plurality of messages of a second message thread, the first plurality of message configured to report a first plurality of status updates to a user via a client device and the second plurality of messages configured to report a second plurality of status updates to the user via the client device;

receiving a specification of a structure or a location of a thread identifier in the first plurality of messages and in the second plurality of messages;

extracting, from the first message thread, a first thread identifier based at least in part on the structure or location of the thread identifier;

extracting, from the second message thread, a second thread identifier based at least in part on the structure or location of the thread identifier;

parsing a first message of the first plurality of messages to identify that the first message is a first latest message in the first message thread and identify a first value from the first message;

parsing a second message of the second plurality of messages to identify that the second message is a second latest message in the second message thread and identify a second value from the second message;

generating, by the PIM, a consolidated status notification, the consolidated status notification comprising the first value from the first message displayed in association with the first message thread and the second value from the second message displayed in association with the second message thread;

generating a user interface for display on the client device that is different from the PIM, the user interface comprising the consolidated status notification having the first value and the second value displayed without including either the first message or the second message; and transmitting the first message from the PIM to the client device for display.

9. The method of claim 8 further comprising:

subsequent to receiving the first plurality of messages and the second plurality of messages, receiving a third message of the first message thread; and updating the user interface such that an updated user interface identifies at least a third value from the third message.

10. The method of claim 9, wherein in the updated user interface, the third value from the third message replaces the first value from the first message.

11. The method of claim 8 further comprising:

transmitting the user interface to the client device without transmitting the first plurality of messages or the second plurality of messages to the client device.

12. The method of claim 8 further comprising:

refraining from transmitting the first message and the second message to the client device, so that the first message and the second message are not displayed by the client device in the user interface.

13. The method of claim 8 further comprising:

determining that the first thread identifier is different from the second thread identifier, indicating that the first message and the second message are from two different message threads, wherein the consolidated status notification identifies both the first value from the first message and the second value from the second message in response to determining that the first thread identifier is different from the second thread identifier.

14. The method of claim 8, wherein:

the first value from the first message represents a first status associated with the first message; and the second value from the second message represents a second status associated with the second message, wherein the first status and the second status both indicate one of created, assigned, estimated, confronted, or resolved.

15. The method of claim 8, wherein the structure or the location of the thread identifier comprises a subject line, a specific field, or a body of a message.

16. A method comprising:
receiving, at a server and from a remote system that is different from the server, a first message of a first message thread and a second message of a second message thread, wherein:
the first message is received by the server on behalf of a client device and is configured to report a first status value to a user of the client device; and
the second message is received by the server on behalf of the client device and is configured to report a second status value to the user of the client device;
identifying one or more rules associated with the first message thread and the second message thread;
analyzing, based at least in part on the one or more rules, the first message to identify that the first message is a first latest message in the first message thread and identify the first status value from the first message;
analyzing, based at least in part on the one or more rules, the second message to identify that the second message is a second latest message in the second message thread and identify the second status value from the second message;
generating, by the server, a first status notification email containing at least the first status value from the first message encoded in a latest status field of the first status notification email, the latest status field being different from a body of the first status notification email;
sending the first status notification email from the server to the client device, wherein the first status notification email displays the first status value and the body of the first message is not visible; and
transmitting the first message of the first message thread from the server to the client device for display.

17. The method of claim 16, further comprising:
subsequent to receiving the first message, receiving a third message of the first message thread; and
sending, from the server to the client device, an updated first status notification email such that the updated first status notification email identifies at least a third status value from the third message.

18. The method of claim 17, wherein in the updated first status notification email, the third status value from the third message replaces the first status value from the first message.

19. The method of claim 16, further comprising:
extracting, from the first message, a first identification number associated with the first message;
extracting, from the second message, a second identification number associated with the second message;
determining that the first identification number is different from the second identification number, indicating that the first message and the second message are from two different message threads; and
generating a second status notification email in addition to the first status notification email in response to the determining that the first identification number is different from the second identification number.

20. The method of claim 16, wherein the remote system is a trouble ticket system and the latest status field includes a latest status of a trouble ticket.

21. The method of claim 16, wherein the server transmits the first message to the client device in response to receiving a user request to view the first message.

\* \* \* \* \*